United States Patent
Arcaini et al.

(10) Patent No.: US 7,844,078 B1
(45) Date of Patent: Nov. 30, 2010

(54) METHOD AND APPARATUS FOR AUTOMATIC ZONE OCCUPATION DETECTION VIA VIDEO CAPTURE

(76) Inventors: Gianni Arcaini, 6622 Southpoint Dr. South, Jacksonville, FL (US) 32216;
Zhipeng Liu, 6622 Southpoint Dr. South, Jacksonville, FL (US) 32216;
Aydin Arpa, 6622 Southpoint Dr. South Suite 310, Jacksonville, FL (US) 32216

( * ) Notice: Subject to any disclaimer, the term of this patent is extended or adjusted under 35 U.S.C. 154(b) by 847 days.

(21) Appl. No.: 11/758,427

(22) Filed: Jun. 5, 2007

(51) Int. Cl.
*G06K 9/00* (2006.01)
*B61B 1/00* (2006.01)
*G05D 3/00* (2006.01)

(52) U.S. Cl. .................. 382/104; 104/26.1; 701/19
(58) Field of Classification Search .......... 382/104; 701/19, 29, 117, 204, 205, 207, 211, 213, 701/20, 35, 210; 340/10.51, 993, 995.19, 340/991; 104/26.1, 162, 26.2, 88.04, 118; 246/3, 36, 70

See application file for complete search history.

(56) References Cited

U.S. PATENT DOCUMENTS

| | | | |
|---|---|---|---|
| 3,944,986 A | 3/1976 | Staples | |
| 4,610,206 A * | 9/1986 | Kubala et al. | 104/26.1 |
| 5,758,848 A * | 6/1998 | Beule | 246/182 B |
| 6,418,854 B1 | 7/2002 | Kraft | |
| 6,516,727 B2 * | 2/2003 | Kraft | 104/26.1 |
| 6,631,322 B1 * | 10/2003 | Arthur et al. | 701/211 |
| 6,647,356 B2 | 11/2003 | Pierro | |
| 6,785,993 B1 | 9/2004 | Lea | |
| 6,832,204 B1 | 12/2004 | Doner | |
| 6,961,682 B2 * | 11/2005 | Doner | 703/2 |

* cited by examiner

*Primary Examiner*—Abolfazl Tabatabai
(74) *Attorney, Agent, or Firm*—Lawrence J. Gibney, Jr.

(57) ABSTRACT

This is a device by which certain areas of classification yards and railcar systems may be monitored via video capture in order to detect certain occupants in a particular area. This would ensure greater rail yard safety in terms of personal property and also minimize the risk of personal injury to a worker or the general population.

15 Claims, 2 Drawing Sheets

METHOD AND APPARATUS FOR AUTOMATIC ZONE OCCUPATION DETECTION VIA VIDEO CAPTURE

BACKGROUND OF THE INVENTION

A. Field of the Invention

This relates to classification yards and railway settings. This is important in order to classify various rail cars and more specifically the cargo within those cars. This classification may become important to segregate different types of cargo or material in rail yards.

B. Prior Art

There are other prior art references to rail yard classification or management systems. A representative example of this can be found at Doner, U.S. Pat. No. 6,961,682. The Doner patent is a method for managing railcar movement in a rail yard based on the flow of rail yard tasks. Employees in the process rely on a memory device and a database. It does not however, employ a camera, which this application provides. The Doner application does predict whether or not a particular train schedule can be met.

Another example specifically related to railways can be found at Craft, U.S. Pat. No. 6,516,726, which is a high capacity and multistaged railway switching yard. This particular device allows railway cars to be classified, using a switching mechanism. It does not, however, use a camera.

Another example in the prior art can also be found at Craft, U.S. Pat. No. 6,418,854, which is a method specifically directed to priority car sorting. This, like the previous Craft and Doner patents, do not employ a camera.

Another example that monitors vehicle movement for railroad terminals can be found at Staples, U.S. Pat. No. 3,944,986. This provides data and voice communication links to a data processing center. Again, it does not provide a camera, which allows an operator at a remote location to focus on a specific area or areas of the yard.

BRIEF SUMMARY OF THE INVENTION

This method and apparatus allows rail yard facilities to ensure that railcars are classified appropriately to prevent injury to workers and the general population. In any rail yard setting, each car must be classified. These classifications yards allow separation and attachment of various cars, depending on a particular destination. Typically, a mechanism is employed such that the car is accelerated and directed through a variety and series of switches onto a destination track. The system then regulates it so that the car is then slowed down and stops at a certain point to connect it to a train and avoid an abrupt collision.

The difficulty arises when incorrect regulation and mechanical malfunction allow the car to stop before the designated point. The presence of a car in an incorrect position may cause collisions within the yard. This obviously, in effect, shuts down the operation of the yard, which costs a great deal of time and money. Additionally many rail cars carry caustic or dangerous material and in the event of a collision these material may spill thereby endangering the workers in the yard as well the potential for injury to the general population and surrounding environment.

In every rail yard classification yard, there is a buffer zone. Railcars should not be in this particular buffer zone for an extended period of time. This particular device would monitor this buffer zone and with the integrated software in the method would alarm an operator who is in a remote location when a railcar is occupying a buffer zone for longer than a predetermined amount of time. This automatic zone of occupation detection is needed to make the process efficient, cost effective and perhaps, more important, makes the rail yard safer.

The invention is comprised of a video capture device and color or black and white is sufficient. The video capture device may be positioned in a variety of ways in the rail yard and no one particular way is being claimed in this application. The video capture device should have the capability to operate in dim lighting situations and infrared capability is probably desired as well. Software is incorporated into the method with preset alarm features. The software uses a processing device as well as a zone detection algorithm and an alarm device to alert the operator at a remote location that a rail car is located in a particular buffer zone longer than a particular period of time.

DETAILED DESCRIPTION OF THE EMBODIMENTS

Figure 1:
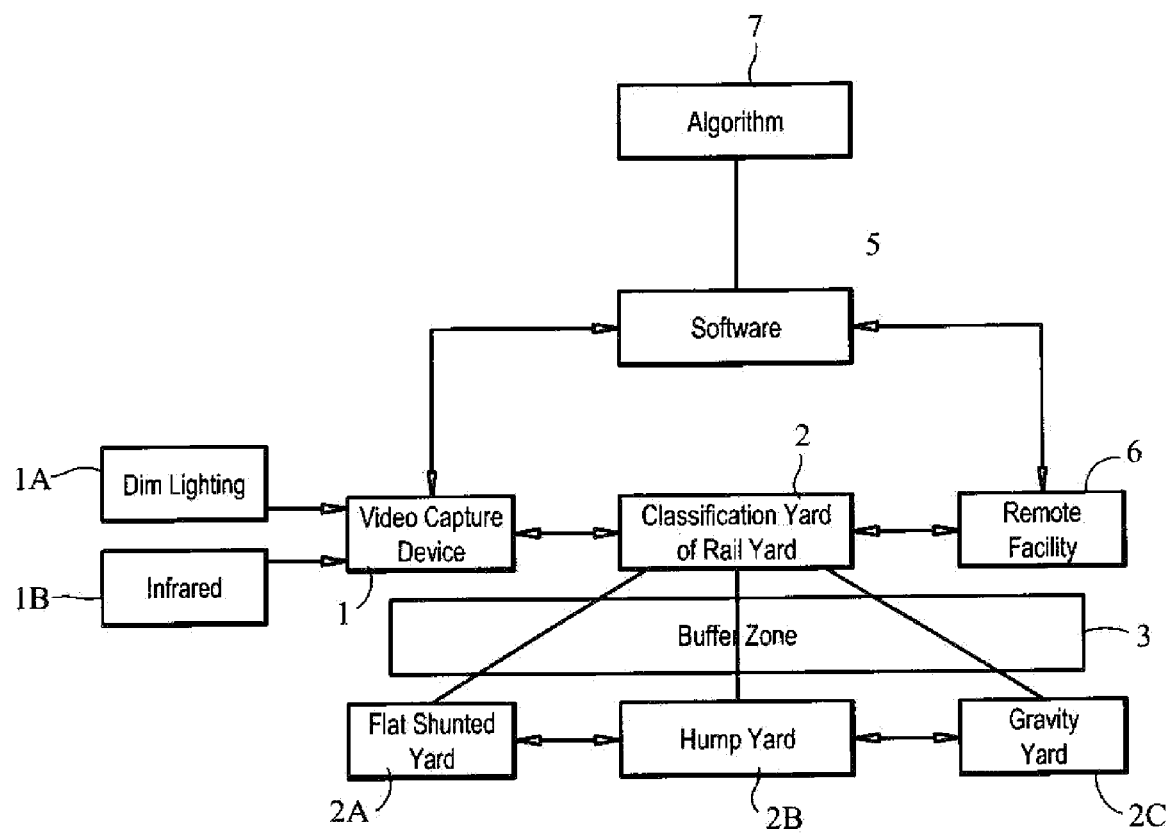
FIG. 1 is a schematic of items used in this method and apparatus.
Figure 2:
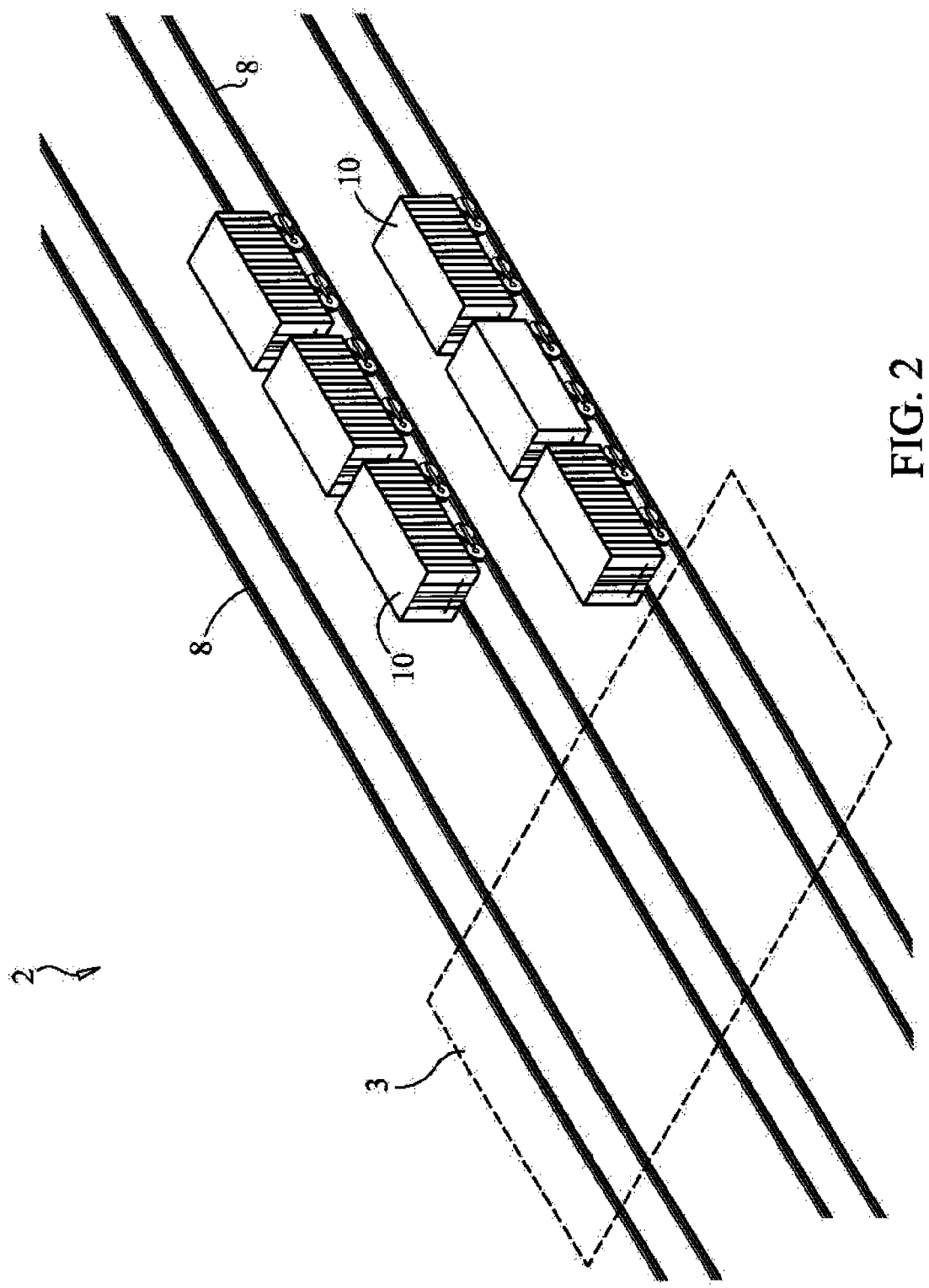
FIG. 2 is a representation of the area of the buffer zone within the rail yard.

In a railway yard, all rail cars 10 are classified in a classification yard 2. These classification yards, which are comprised of series of tracks 8 are used to direct particular railcars to particular areas, depending on destination points. A classification yard may include a flat shunted yard 2A, a hump yard 2B or a gravity yard 2C. This method can be used in any classification yard 2. Classification yards 2 allow individual railcars 10 to be detached from trains and then directed by a plurality of switches to a different area of the rail yard. Hundreds of rail cars may be found in any given classification yard.

Additionally, buffer zones 3 are installed in classification yards 2 to provide a sufficient area to prevent collision between cars. A collision between rail cars, at a very minimum, causes property damage. In the event of a spill of caustic material, which is frequently transported in rail cars, the risk of injury to people and the environment could be disastrous.

This device uses a video capture device 1 such as a camera to monitor a certain zone of a classification yard and send an alarm to a remote location 6 when the buffer zone 3 is occupied by a railcar or railcars 10 for longer than a predetermined period of time. Although this method and apparatus is employed and discussed specifically for rail yards, this method and apparatus may have other applications in terms of monitoring particular locations and alerting personnel by sounding an alarm.

The capture device can be a camera wherein the camera may be color or black and white, and the camera should contain sufficient range to view the entire buffer zone that is designated by the operator of the rail system. The video capture device 1 will operate in periods of low lighting 1A and have infrared capability 1B as well and may produce a color image or a black and white image.

The video images captured by the device would be directed to software 5 which would then process the captured video image. The software would be comprised of a zone occupation detection algorithm 7. The algorithm 7 will be comprised of four specific stages: frame processing, feature extraction, occupation detection and alarm feature.

The frame processing would process a particular frame or frames within the video capture image. This would allow the second phase, feature extraction, to extract certain features from particular frames. The third phase would be the occupation detection of a particular area, and some description of the general occupants of a particular area. Additionally, there would also be a feature update to provide real time video imaging of a particular area. The last phase would include an alarm feature, which may be visual as well as audible to alert personnel at remote locations.

One challenge is to ensure that a railcar is being detected as opposed to tracks or other environmental conditions. The environmental conditions in the classification yard, of course, may change. The algorithm may be easily updated to reflect any change in environmental conditions. There also must be some discrimination in terms of varying lighting conditions particularly during the day but also at night. For that purpose the video capture device may be equipped with infrared capability.

The invention claimed is:

1. An apparatus for automatic zone occupation and detection of video capture, which is comprised of:
   a. a video capture device;
   wherein a video capture device is provided;
   wherein the video capture device is positioned at a predetermined location;
   wherein the placement of the video capture device is positioned to obtain the greatest area of coverage of a predetermined area;
   b. a classification yard;
   said classification yard is comprised of a series of tracks on which a plurality of rail cars will travel;
   railcars to be directed to particular locations within the yard;
   c. a buffer zone;
   wherein a buffer zone is established within the classification yard;
   wherein the buffer zone is a predetermined area within the classification yard;
   d. a switching mechanism;
   wherein the switching mechanism directs railcars on the tracks in the classification yard;
   wherein a plurality of switches directs the flow or rail cars in the classification yard;
   e. software;
   wherein software processes the captured video image;
   wherein the software produces an algorithm of the information that is processed;
   wherein the algorithm that is produced is transmitted to a remote location;
   wherein the software may be altered to accommodate changes in environmental conditions.

2. The apparatus as described in claim 1 wherein the captured image is black and white.

3. The apparatus as described in claim 1 wherein the captured image is a color image.

4. The apparatus as described in claim 1 wherein the video capture device has infrared capability.

5. The apparatus as described in claim 1 wherein the video capture device operates in low lighting environments.

6. The apparatus as described in claim 1 wherein the classification yard is a flat shunted yard.

7. The apparatus as described in claim 1 wherein the classification yard is a hump yard.

8. The apparatus as described in claim 1 wherein the classification yard is a gravity yard.

9. The apparatus as described in claim 1 wherein the algorithm that is produced is further comprised of four separate phases;
   wherein the first phase is a frame processing phase;
   wherein the second phase is a feature extraction phase;
   wherein the third phase is an occupation detection phase;
   wherein the fourth phase is an alarm feature phase.

10. The apparatus as described in claim 1 is further comprised of a visual alarm.

11. The apparatus as described in claim 1 is further comprised of an audible alarm.

12. A method for automatic zone occupation and detection of video capture, which is comprised of the following steps:
   a. employing a video capture device;
   wherein the video capture device is positioned at a predetermined location within a rail yard;
   wherein the placement of the video capture device is positioned to obtain the greatest area of coverage of a predetermined area;
   b. providing a buffer zone;
   wherein a buffer zone is established within a classification yard;
   said classification yard is comprised of a series of tracks on which a plurality of rail cars will travel;
   wherein a classification yard allows certain railcars to be directed to particular locations within the rail yard;
   wherein the buffer zone is a predetermined area within the classification yard;
   c. providing a switching mechanism;
   wherein the switching mechanism directs railcars on the tracks in the classification yard;
   wherein a plurality of switches directs the flow or rail cars in the classification yard;
   d. software;
   wherein software processes the captured video image;
   wherein the software produces an algorithm of the information that is processed;
   wherein the algorithm that is produced is transmitted to a remote location;
   wherein the software may be altered to accommodate changes in environmental conditions;
   e. providing alarms;
   wherein alarms are provided to alert the operator of the system based on preset configurations.

13. The method as described in claim 12 wherein the classification yard is a flat shunted yard.

14. The method as described in claim 12 wherein the classification yard is a hump yard.

15. The method as described in claim 12 wherein the classification yard is a gravity yard.

* * * * *